Nov. 26, 1963 M. L. MILLER 3,112,449

CONVERTER FOR CONVERTING ALTERNATING CURRENT SIGNALS TO PROPORTIONAL CONSTANT POLARITY SIGNALS INCLUDING COMPENSATING DIODE FEEDBACK

Filed Sept. 29, 1961 2 Sheets-Sheet 1

Inventor:
Meritt L. Miller,
by [signature]
Attorney.

Nov. 26, 1963 M. L. MILLER 3,112,449

CONVERTER FOR CONVERTING ALTERNATING CURRENT SIGNALS TO PROPORTIONAL CONSTANT POLARITY SIGNALS INCLUDING COMPENSATING DIODE FEEDBACK

Filed Sept. 29, 1961 2 Sheets-Sheet 2

Inventor:
Meritt L. Miller,
by Henry J. Marcinich
Attorney.

United States Patent Office 3,112,449
Patented Nov. 26, 1963

3,112,449
CONVERTER FOR CONVERTING ALTERNATING CURRENT SIGNALS TO PROPORTIONAL CONSTANT POLARITY SIGNALS INCLUDING COMPENSATING DIODE FEEDBACK

Meritt L. Miller, Fort Wayne, Ind., assignor to General Electric Company, a corporation of New York
Filed Sept. 29, 1961, Ser. No. 141,655
10 Claims. (Cl. 328—26)

This invention relates to signal converters and more particularly to signal converters capable of accurately converting an alternating current signal on the order of several millivolts or more to a direct current signal of proportional magnitude.

Conventional rectifying circuits, such as bridge rectifiers and other circuits utilizing diodes as a means to change an alternating current into a pulsating direct current, will not conduct current until the forward voltage of the diodes reaches a predetermined level. For example, a typical silicon diode will require about .4 to .6 volt before it will start conducting current. This inability of diodes to conduct at low signal levels has imposed limitations on curtain applications of conventional rectifying circuits employing diodes. Conventional rectifying circuits have not been suitable in certain analog computer applications where it is required that signals of varying polarity on the order of several millivolts or more be accurately converted to a signal of constant polarity and proportional magnitude. It will be understood that even where diodes are used to rectify signals of appreciable magnitude, the inability of the diodes to conduct at low signal levels still introduces a nonlinearity at the point where the voltage approaches zero.

In circuits used in analog computers, it is frequently necessary that an alternating current signal of widely varying magnitude be accurately converted to a proportional direct current signal. For example, in an absolute value circuit, it is required that negative and positive signals be accurately converted to proportional signals of the same polarity. In many instances, the conversion of an alternating current signal is necessary in order that voltage, ampere or wattage measurements can be continuously recorded. It is, therefore, desirable that a signal converter be provided that is capable of converting alternating current signals of relatively small magnitude to proportional signals of constant polarity over a wide range of input signals.

Accordingly, it is a general object of this invention to provide an improved signal converter capable of rectifying signals of relatively small magnitude.

Another object of the invention is to provide an improved signal converter that will proportionally convert a signal of varying polarity to a proportional signal of constant polarity for a wide range of input signal values.

It is a more specific object of the present invention to provide an improved voltage converter capable of converting relatively small alternating current signals to direct current signals of proportional magnitude.

These and other objects and advantages of the invention are achieved in a signal converter having at least one amplifier wherein a pair of compensating diodes or other unilaterally conducting devices connected in inverse parallel relation are included in the feedback path of the amplifier. The two compensating diodes tend to remove the feedback voltage across the amplifier so that the forward voltage across one or more rectifying diodes associated with the output of the amplifier will reach a point where the rectifying diodes conduct current for all values of the input signal. The compensating diodes have substantially the same forward voltage characteristics as the rectifying diodes so that the inability of the rectifying diodes to conduct at extremely low voltages is effectively compensated for by the compensating diodes. It was found that the compensating diodes caused the output voltage of the amplifier to be displaced by the amount of the forward voltage drop of the rectifying diodes.

If it is desired to convert signals of both positive and negative polarity to proportional signals of constant polarity, a pair of rectifying diodes or other unilaterally conducting devices and a sign reversing means are associated with the output of the amplifier. One of the rectifying diodes is connected in circuit with the output lead of the amplifier and poled so that it will conduct when the forward voltage at its anode is positive with respect to the cathode. The other rectifying diode is connected in circuit with the sign reversing means at the output side thereof and is poled so that it will conduct when the voltage at its anode is positive with respect to the cathode. The cathodes of both rectifying diodes are connected to a converter output lead. Thus, a signal of either positive or negative polarity applied at the input of the amplifier will appear at the converter output lead as signal that is proportional in magnitude and that is of constant polarity.

In another aspect of the invention, I have provided a voltage converter wherein an amplifier is used in conjunction with a center tapped transformer having a pair of rectifying diodes arranged so that a rectified output is provided at the transformer output. In accordance with the invention, a pair of compensating diodes inversely connected in parallel are provided in the feedback path of the amplifier. The two compensating diodes block the feedback current until the secondary voltage is sufficient to permit the rectifying diodes to conduct current that is substantially proportional in magnitude to the input signal. The forward voltage drop characteristics of the compensating diodes are essentially the same as the forward voltage drop characteristics of the rectifying diodes.

The term "forward voltage drop characteristic" as used herein denotes the minimum forward voltage between anode and cathode that will cause the diode to conduct.

Further aspects of the invention will become apparent from the more detailed description of the invention. It will be understood that the specification concludes with claims which particularly point out and distinctly claim the subject matter which I regard as my invention. The invention, however, both as to organization and method of operation, together with further objects and advantages thereof, may be best understood by reference to the following description taken in conjunction with the accompaying drawing in which:

Figure 1:
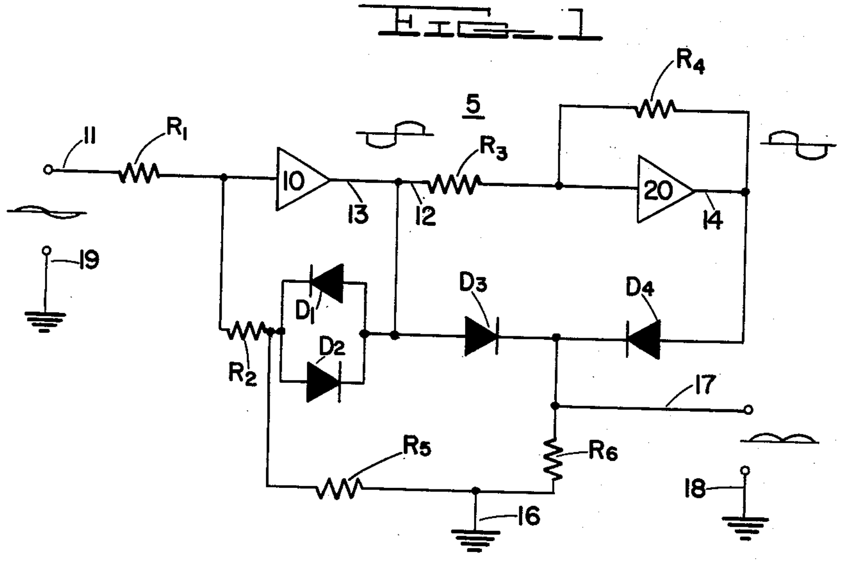
FIG. 1 is a schematic circuit diagram of one embodiment of the invention wherein a pair of amplifiers are employed in the signal converter according to the invention.
Figure 3:
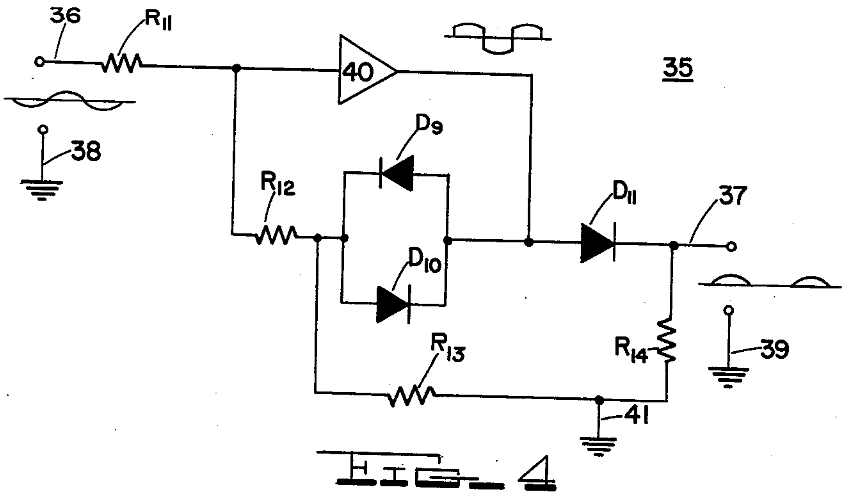
Figure 4:
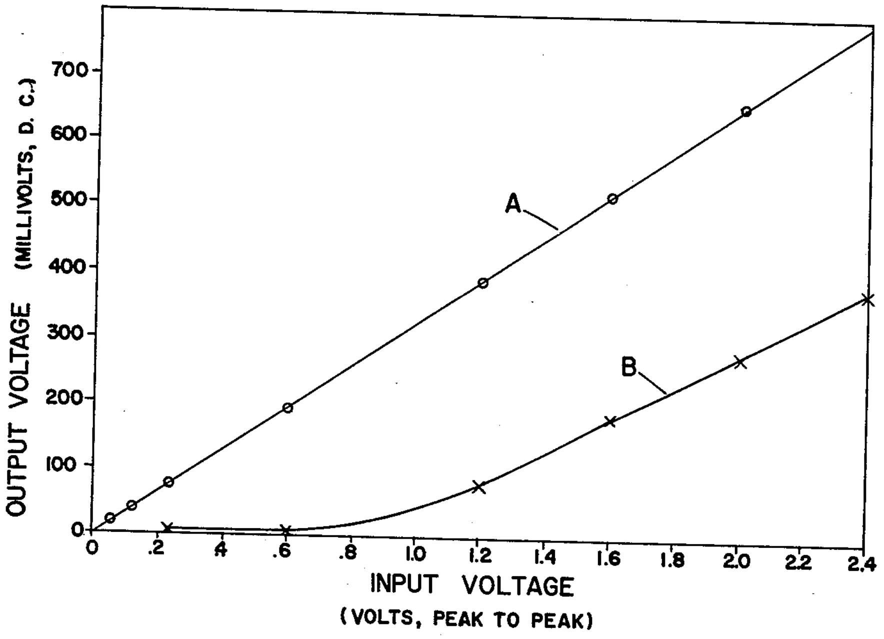

FIG. 3 is a schematic circuit diagram of a half wave signal converter according to the invention; and FIG. 4 shows a pair of curves, A and B, representing a plot of the output voltage in millivolts, D.C. against input voltage (peak to peak volts), curve A showing values corresponding to the circuit shown in FIG. 1 and curve B representing the plot of values obtained when the compensating diodes in accordance with the invention are not employed in the circuit.

Figure 2:
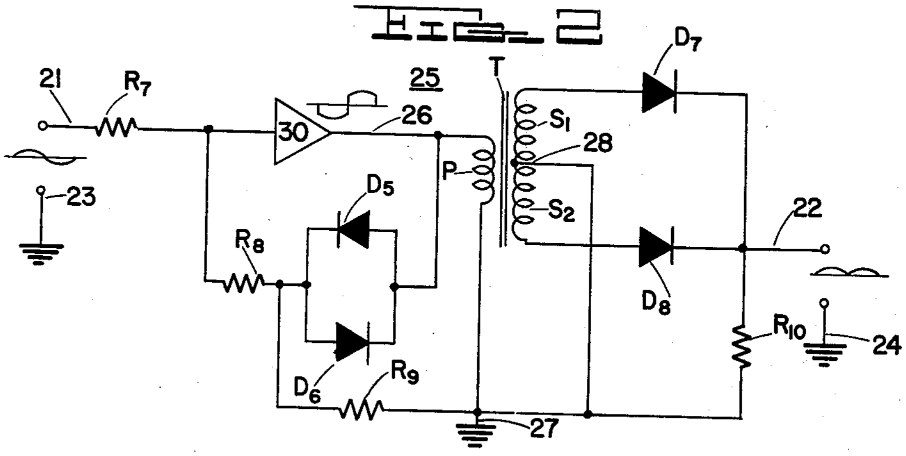
FIG. 2 is a schematic circuit diagram of another embodiment of the invention wherein an amplifier is employed in conjunction with a center tapped transformer in accordance with the invention.

In FIGS. 1, 2 and 3, the amplifiers employed in the schematic circuits are identified by the reference numerals 10, 20, 30 and 40. Amplifiers 10, 20, 30 and 40 preferably have wide band characteristics and may, if desired, be stabilized by any suitable means, such as the well known chopper stabilization circuit, details of which are not essential to the understanding of the present invention. The amplifiers 10, 20, 30 and 40 employed in the illustrative embodiments of the invention were chopper stabilized operational amplifiers. Amplifiers which may be used are discussed and illustrated in chapter two of the text entitled "Analog Methods in Computation and Simulation" by W. W. Soroka (first edition) published by McGraw-Hill Book Company, Inc. In such operational amplifiers, if an impedance element such as an input resistor is connected at the input of the amplifier and an impedance element such as a feedback resistor is connected across the amplifier, the output signal will be equal to the input signal multiplied by the ratio of the resistance of the feedback resistor to the resistance of the input resistor. The resistance of the input and feedback resistors used in conjunction with amplifiers 10, 20, 30 and 40 were substantially equal in magnitude. Accordingly, the amplifiers in the illustrative embodiments of the invention have unity gain and thereby serve to invert the input signals. However, it will be apparent that, if required, the resistance ratio may be varied to provide a desired amplification. In addition, it will be seen that amplifiers 10, 30 and 40 also serve to displace the input signal vertically (both above and below the axis) by a predetermined amount from the zero axis, as will be seen from the voltage wave form shown near the output of the amplifiers in order to compensate for the inability of the rectifying means associated therewith to conduct signals.

Referring now more specifically to FIG. 1, the voltage converter is generally identified by reference numeral 5. The voltage converter 5 includes a pair of serially connected amplifiers 10 and 20 having input leads 11, 12 and output leads 13, 14, respectively. An input resistor $R_1$ is connected in circuit with the input lead 11 of amplifier 10 and likewise an input resistor $R_3$ is connected in circuit with input lead 12 of amplifier 20.

The feedback path of the amplifier 10 includes a pair of compensating diodes $D_1$ and $D_2$, which are connected in inverse parallel relation and are connected in series circuit with a feedback resistor $R_2$. A feedback resistor $R_4$ is aslo connected in circuit with input lead 12 and the output lead 14 of amplifier 20.

A pair of diodes $D_3$, $D_4$ connected in circuit with the amplifiers 10 and 20 are hereinafter referred to as rectifying diodes $D_3$, $D_4$ to distinguish these diodes from the compensating diodes $D_1$, $D_2$ which perform a different function. Preferably, unilaterally conducting devices such as silicon diodes having substantially the same forward voltage drop characteristics may be employed as the compensating diodes $D_1$ and $D_2$ and the rectifying diodes $D_3$ and $D_4$. It will be noted that the anode of rectifying diode $D_3$ is connected in circuit with the output lead 13 of amplifier 10 and the anode of rectifying diode $D_4$ is connected in circuit with the output lead 14 of amplifier 20. The resistor $R_5$ is employed to cause the current conducted by diodes $D_1$ and $D_2$ to be approximately of the same magnitude as the current conducted by diodes $D_3$ and $D_4$. It will be appreciated that the use of the resistor $R_5$ is not essential to the operation of the converter 5. However, it was found to improve the linearity at low signal levels. Resistor $R_6$ is connected to a grounded lead 16 and limits the current to ground. A converter output lead 17 is coupled to the cathodes of rectifying diodes $D_3$ and $D_4$, which are similarly poled with respect to the output lead 17. Further, it will be seen that a grounded reference terminal 18 is shown schematically in conjunction with the converter output lead 17 and also a grounded reference terminal 19 is shown in conjunction with the input terminal lead 11.

In the embodiment shown in FIG. 2, a single amplifier 30 is used in connection with a center tapped transformer T. The converter shown therein is generally identified by reference numeral 25. An input lead 21 is provided for connection in circuit with a signal source (not shown). The signal at input lead 21 is arbitrarily shown as an alternating current signal. It will be appreciated that signals of other waveshapes can be converted. At converter output lead 22, the output signal is shown as a full wave rectified signal. Reference ground terminal leads 23, 24 are shown in conjunction with input lead 21 and converter output lead 22, respectively.

An input resistor $R_7$ is connected in circuit with input lead 21 which is coupled to the input of amplifier 30. A feedback resistor $R_8$ is connected in the feedback path across input lead 21 and output lead 26 of amplifier 30. The resistor $R_8$ is connected in circuit with compensating diodes $D_5$ and $D_6$, which are connected in inverse parallel relationship in the feedback path of amplifier 30. The output lead 26 of amplifier 30 is connected in circuit with one end of the primary winding P of transformer T. At the other end the primary winding P is connected in circuit with a grounded lead 27. Although in the illustrative embodiment of the invention the transformer T had a 1:1:1 turns ratio, it will be understood that transformers having other turns ratios may be employed.

A secondary winding comprised of winding portions $S_1$ and $S_2$ and a center tap 28 is inductively coupled with the primary winding P. The anode of rectifying diode $D_7$ is connected in circuit with secondary winding portion $S_1$ and the anode of rectifying diode $D_8$ is connected in circuit with secondary winding portion $S_2$. Thus, diode $D_7$ will conduct when the polarity of the voltage induced across the secondary winding portion $S_1$ is such that the upper end is positive with respect to the lower end. Diode $D_8$ will conduct when the polarity of the voltage induced across the secondary winding portion $S_1$ is such that the upper end is positive with respect to the lower end. Diode $D_8$ will conduct when the polarity of the voltage induced across the secondary winding portion $S_2$ is such that the lower end is positive with respect to the upper end. It will be noted that the cathodes of rectifying diodes $D_7$, $D_8$ are connected in circuit with the converter output lead 22. Resistor $R_9$ is employed to adjust the current conducted by diodes $D_1$ and $D_2$ so that it is approximately the same in magnitude as the current conducted by diodes $D_3$ and $D_4$. It was found that the use of this resistor improved the linearity at low signal levels. Resistor $R_{10}$ limits the current flow from the converter 25 to ground.

In FIG. 3, I have illustrated an embodiment of the invention wherein a converter 35 achieves half wave rectification of a signal applied at input lead 36. It will be seen that at converter output lead 37 a rectified half wave signal is obtained when an alternating current signal is applied at input lead 36. Reference ground terminals 38, 39 are shown in conjunction with input lead 36 and output lead 37, respectively. Resistor $R_{13}$ and $R_{14}$ are connected in circuit with the ground connection 41.

To compensate for the inability of rectifying diode $D_{11}$ to conduct at low signal levels, a pair of compensating diodes $D_9$ and $D_{10}$ are connected inversely in parallel in the feedback path of amplifier 40. Preferably, the compensating diodes $D_9$ and $D_{10}$ have substantially the same forward voltage drop characteristics as the rectifying diode $D_{11}$. In this exemplification of the invention, the resistance of the input resistor $R_{11}$ was also equal to the resistance of the feedback resistor $R_{12}$. Thus, amplifier 40 had a unity gain.

Referring to the converter 5 shown in FIG. 1, the operation of this circuit will now be more fully described. Assuming an alternating current signal having a peak voltage of approximately .3 volt is applied at the input terminal lead 11, the signal at the output lead 13 of amplifier 10 is inverted and displaced from the zero axis by the magnitude of the forward voltage drop of the compensating diodes $D_1$ and $D_2$.

Let us take an arbitrary half cycle when the voltage at the input lead 11 of amplifier 10 is positive. It will be seen that during this half cycle the voltage at output lead 13 is negative and displaced by the magnitude of the forward voltage drop of compensating diode $D_2$ since the compensating diode $D_2$ blocks current in the feedback path until the voltage at the output of amplifier 10 reaches the forward voltage of compensating diode $D_2$ Further, during this half cycle the voltage at output lead 14 of amplifier 20 is positive, since amplifier 20 serves as a sign reversing means. Since at this instant the voltage at the anode of rectifying diode $D_4$ is positive with respect to its cathode, it will conduct current when the voltage exceeds its forward voltage drop. Since the forward voltage drop of diode $D_4$ is substantially the same as the forward voltage drop of diode $D_2$, only the sinusoidal portion of the voltage appears at the converter output lead 17.

In the next half cycle, when the voltage signal at input lead 11 swings negative, the signal at output lead 13 is positive and displaced from the zero axis by the amount of the forward voltage drop of compensating diode $D_1$. During this half cycle, rectifying diode $D_4$ is in a blocking state since amplifier 20 has converted this positive signal to a negative signal. However, the voltage at the anode of rectifying diode $D_3$ is positive with respect to its cathode, and rectifying diode $D_3$ conducts when its forward voltage drop is exceeded. Since its forward voltage drop is substantially the same as the forward voltage drop of compensating diode $D_1$, only the sinusoidal portion of the voltage at the output of amplifier 10 appears at converter output lead 17.

It will be appreciated that the compensating diodes $D_1$ and $D_2$ remove the feedback voltage across amplifier 10 until the voltage at its output has risen to a value sufficient to cause the rectifying diodes $D_3$ and $D_4$ to conduct. For the silicon diodes used in the illustrative embodiment of the invention, a forward voltage of approximately .6 volt was required to cause the diodes $D_3$ and $D_4$ to conduct. A conventional rectifier employing such silicon diodes would not conduct signals having a voltage below the forward drop of the diodes. In accordance with the invention, the failure to the rectifying diodes $D_3$ and $D_4$ to conduct current at low voltage levels is compensated for by a small step in the voltage near the zero crossing point provided by the compensating diodes in the feedback path of the amplifier 10. At higher signal levels, this step in the voltage near the zero crossing also compensates for the inability of the diodes to conduct at low voltage levels.

In FIG. 4, I have illustrated two curves, A and B, which represent a plot of output voltage versus input peak-to-peak voltage. Curve A represents the plot obtained for the converter 5 in accordance with the invention as shown in FIG. 1. It will be seen that a substantially linear conversion is obtained for all values of input peak-to-peak voltage. Curve B shows the plot of values obtained for a converter which did not employ the compensating diodes in accordance with the invention. For small values of input signals, it will be apparent the conversion of the signals is not linear.

The signal converter 5, as shown in FIG. 1 and employing the following circuit components was constructed and successfully operated:

| | |
|---|---|
| Silicon diodes $D_1$, $D_2$, $D_3$, $D_4$ | General Electric IN1695. |
| Amplifiers **11**, **12** | Philbrick operational amplifier K2X with a Philbrick K2P chopper stabilizer. |
| Resistors $R_1$, $R_2$, $R_3$, $R_4$ | 100,000 ohms. |
| Resistor $R_5$ | 11,000 ohms. |
| Resistor $R_6$ | 10,000 ohms. |

With the converter 5 employing these components, it was possible to achieve a conversion of signals in a dynamic range of 6,000 to 1. The converter was capable of converting alternating current signals having a magnitude ranging from 8 millivolts R.M.S. to 50 volts R.M.S. The voltage converter of the present invention is particularly useful in analog computer systems where it is required to convert a signal which varies in polarity to a proportional signal of constant polarity. Thus, the converter may be used as an absolute value circuit.

In FIG. 2, I have shown the compensating diode arrangement of the invention used in conjunction with a center tapped transformer T. The compensating diodes $D_5$ and $D_6$ have substantially the same forward voltage drop as the rectifying diodes $D_7$ and $D_8$ so that the compensating diodes $D_5$ and $D_6$ block the feedback current when the forward voltage across the diodes $D_7$, $D_8$ is insufficient to cause the diodes to conduct. The transformer T serves primarily as a sign changing means since the secondary winding portions $S_1$ and $S_2$ and primary winding P are in a one to one turns ratio.

Taking an arbitrary half cycle when the signal applied at input lead 21 is positive, it will be seen that the signal at the output of the amplifier 30 is negative. Consequently, the polarity of the voltage across the primary winding P of transformer T will be such that the upper end will be negative. The polarity of the voltage induced in the secondary winding portion $S_1$ will be such that its upper end as viewed in the circuit, as shown in FIG. 2, will be positive. Consequently, the voltage at the anode of the rectifying diode $D_7$ will be positive and it will conduct when the voltage exceeds its forward voltage drop. Thus, only the sinusoidal portion of the voltage induced in the secondary winding portion $S_1$ appears at converter output lead 22.

In the next half cycle, it will be seen that the polarity of the voltage across the primary winding P of transformer T will be such that its upper end will be positive, and the voltage induced across the secondary winding portion $S_2$ will be such that the voltage of the lower end of the secondary winding portion $S_2$ be negative. During this half cycle rectifying diode $D_7$ will be in a blocking state, and diode $D_8$ will conduct when its forward voltage drop is exceeded. Thus, the two rectifying diodes $D_7$ and $D_8$ conduct alternately since in any half cycle the anode of one of the diodes, $D_7$ or $D_8$, is positive and the anode at the voltage of the other is negative. When the polarity of the voltage reverses, the diode that was conducting in the preceding half cycle returns to a blocking state and the other diode conducts.

The signal converter 25, shown in FIG. 2, provides the advantage that only one amplifier is employed and extremely low voltage signals can be accurately rectified in such a manner that they are directly proportional to the signal amplitude. The signal converter 25 will rectify signals over the pass band of the transformer with an accuracy as great as the linearity of the transformer T.

In FIG. 3, the signal converter 35 rectifies only the negative signals applied at input terminal lead 36. In accordance with the invention, the amplifier 40 inverts the signal applied at the input and displaces this signal from the zero axis by an amount equal to the forward voltage drop of the compensating diodes $D_9$, $D_{10}$. Rectifying diode $D_{11}$ permits only the positive sinusoidal portion of the output signal of amplifier 40 to appear at converter output lead 37. Thus, it will be appreciated that in the converter shown in FIG. 3, as well as in the converter of FIGS. 1 and 2, the failure of the rectifying diodes to conduct at low signal levels is compensated for by a small step in the voltage near the zero crossing point.

From the foregoing description of the structural features and operation of the illustrated embodiments of the invention, it will be seen that it is possible to achieve an accurate conversion of a wide range of signals that vary in polarity to a proportional signal of constant polarity. The signal inverter in accordance with the invention is capable of converting signals in the order of several millivolts. As compared with conventional rectifying circuits, the signal inverter of the invention makes it possible to obtain rectification over a greater dynamic range of signal values with improved linearity.

While the present invention has been described by reference to preferred embodiments thereof, it is to be understood that many modifications may be made by those skilled in the art without actually departing from the invention. It will be apparent that other sign reversing circuits can be used in the signal inverter in accordance with the invention. It is, therefore, intended by the appended claims to cover all such modifications that fall within the true spirit and scope of the invention.

What I claim as new and desire to secure by Letters Patent of the United States is:

1. A signal converter comprising an amplifier including a feedback path, a feedback impedance element connected in said feedback path and an input impedance connected in circuit with said amplifier at the input thereof, the impedances of said elements having a predetermined ratio, a pair of compensating diodes connected in inverse parallel relationship in the feedback path of said amplifier, a sign reversing means connected in circuit with the output lead of said amplifier, and rectifying means connected in circuit outside of the feedback path of the amplifier and with at least said sign reversing means to provide rectification of the amplified input signal of said amplifier, said compensating diodes blocking the current in the feedback path of said amplifier below predetermined signal levels so that the voltage across said rectifying means is sufficient to cause conduction of current therethrough and said compensating diodes and said rectifying means having essentially the same forward voltage drop characteristics.

2. A signal converter set forth in claim 1 wherein said rectifying means includes a pair of rectifying diodes, one of said rectifying diodes being connected in circuit with the output of said amplifier and the other of said rectifying diodes being connected in circuit with said sign reversing means.

3. A signal converter comprising a first and a second amplifier each of said amplifiers having a feedback path, a feedback impedance element connected in said feedback path and an input impedance element connected at the input thereof, the impedances of said elements being substantially equal in magnitude, a pair of compensating diodes connected in inverse parallel circuit relation in said feedback path of said first amplifier, a first and a second rectifying diode, circuit means coupling the output of said first amplifier in circuit with the input of said second amplifier and connecting said first and second rectifying diodes in circuit with said first and second amplifiers respectively so that a unidirectional output signal is provided at the output of said signal converter, said output signal being proportional to the alternating current signal supplied to said first amplifier and said compensating diodes blocking the current in the feedback path of said amplifier below a predetermined signal level so that the voltage across said rectifying means is sufficient to cause conduction of current therethrough.

4. The signal converter set forth in claim 3 wherein the forward voltage drop characteristics of said rectifying diodes and said compensating diodes are substantially similar.

5. A signal converter comprising a first amplifier, a second amplifier connected in series circuit relationship with said first amplifier, each of said amplifiers including a feedback path, a feedback resistor connected in circuit in said feedback path and an input resistor connected in circuit at the input of the amplifier, a first rectifying means connected in circuit with the output of said first amplifier, a second rectifying means connected in circuit with the output of said second amplifier, an output lead connected in circuit with both of said rectifying means, said rectifying means alternately allowing only unidirectional signals to be supplied to said output lead, a pair of compensating diodes connected in inverse parallel relationship in the feedback path of said first amplifier, said compensating diodes blocking the current in the feedback path of said first amplifier below a predetermined signal level so that the forward voltage across said rectifying means is sufficient to cause conduction of current therethrough.

6. A signal converter comprising a first amplifier, a second amplifier, each of said amplifiers including an input lead, an output lead, a feedback path connecting said input and output leads, a feedback resistor connected in circuit in said feedback path and an input resistor connected in circuit with the input lead, said output lead of said first amplifier being connected in circuit with the input lead of said second amplifier, a first diode connected in circuit with the output lead of the first amplifier and in circuit with the input lead of said second amplifier, a second diode connected in circuit with the output lead of said second amplifier, a converter output lead connected in circuit with the cathodes of said first and second diodes, said diodes alternately conducting to provide unidirectional signals at said converter output lead proportional to the alternating current signal applied at the input lead of said first amplifier, and a pair of compensating diodes connected in inverse parallel relation in the feedback path of said first amplifier, said compensating diodes blocking the current in the feedback path of said first amplifier when the forward voltage across said rectifying diodes is insufficient to cause conduction of current therethrough.

7. A signal converter for effecting rectification of an alternating current signal, said converter including at least one rectifying diode, a circuit comprising a amplifier having an input lead, an output lead, a feedback path connected across said input and output lead, said rectifying diode connected in circuit with the output lead outside of said feedback path, a feedback resistor connected in circuit in said feedback path and an input resistance connected in circuit with said input lead, the resistance of said input resistor being substantially equal in magnitude to the resistance of said feedback resistor, and a pair of compensating diodes connected in inverse parallel relation in said feedback path, said compensating diodes blocking the current in the feedback path of said amplifier below a predetermined signal level so that the voltage across said rectifying diode is sufficient to cause conduction of current therethrough and said forward voltage drop characteristics of said compensating diodes and rectifying diode being substantially similar.

8. A converter for providing an output signal of constant polarity with reference to a common ground proportional to the magnitude of an input signal of either polarity with respect to said common ground, said converter comprising a transformer having a primary and a center tapped secondary winding having a first winding portion and a second winding portion, a pair of rectifying diodes connected in circuit with said secondary winding, a converter output lead connected in circuit with said rectifying diodes, said rectifying diodes being poles to alternately conduct current during successive alternations of the voltage induced across said first and second winding portions and thereby provide a full wave rectified voltage at said output lead, an amplifier having an output lead, an input lead and a feedback path connected across said amplifier output and input leads, a feedback resistor connected in circuit in said feedback path, an input resistor connected in circuit with said input lead, the resistance of said input resistor being substantially equal to the resistance of said feedback resistor, a pair of compensating diodes connected in inverse parallel relation in said feedback path and circuit means connecting the output lead of said amplifier in circuit with the primary winding of said transformer, said forward voltage drop characteristics of said compensating diodes being substantially similar to the forward voltage drop characteristics of said rectifying diode.

9. A converter for providing an output signal of constant polarity proportional to the magnitude of the input signal which may be of either polarity, said converter comprising a first amplifier having a feedback path, a first and a second unilaterally conducting device, said first and second unilaterally conducting devices being oppositely poled and connected in parallel relation in said feedback path, a second amplifier, means coupling the output of said first amplifier to the input of said second amplifier, a third and fourth unilaterally conducting device, an output lead, said third and fourth unilaterally conducting devices being similarly poled with respect to said output lead, and means coupling said third unilaterally conducting device with the output of said first amplifier and coupling said fourth unilaterally conducting device with the output of said second amplifier, said first and second unilaterally conducting means blocking the current in the feedback path of said first amplifier below a predetermined signal level so that the voltage across said third and fourth unilaterally conducting devices is sufficient to cause conduction thereof.

10. A signal converter for providing an output signal of constant polarity with reference to a common ground proportional to the magnitude of an input signal of either polarity with respect to said common ground, said converter comprising an amplifier having a feedback path, a first and a second unilaterally conducting device, said first and second unilaterally conducting devices being oppositely poled and connected in parallel circuit relation in the feedback path of said amplifier, a third unilaterally conducting device and means coupling said third unilaterally conducting device with the output of said amplifier, said first and second unilaterally conducting means blocking the current in the feedback path of the amplifier below a predetermined signal level so that the voltage across said third unilaterally conducting device is sufficient to cause conduction thereof and said forward voltage drop characteristics of said first and second unilaterally conducting devices being essentially similar to the forward voltage drop characteristics of said third unilaterally conducting device.

References Cited in the file of this patent

UNITED STATES PATENTS

| | | |
|---|---|---|
| 2,511,562 | Bresee | June 13, 1950 |
| 2,944,218 | Newbold | July 5, 1960 |
| 3,031,142 | Cohen et al. | Apr. 24, 1962 |
| 3,063,001 | White | Nov. 6, 1962 |